Nov. 15, 1960 H. HARHUIS ET AL 2,960,595
ASSEMBLY METHOD FOR CATHODE-RAY TUBE ELECTRODE SYSTEM
Filed Oct. 18, 1956
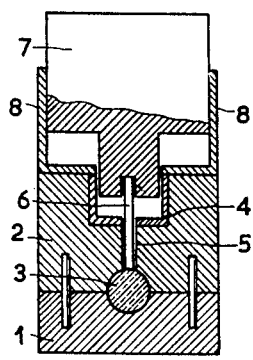
FIG.1
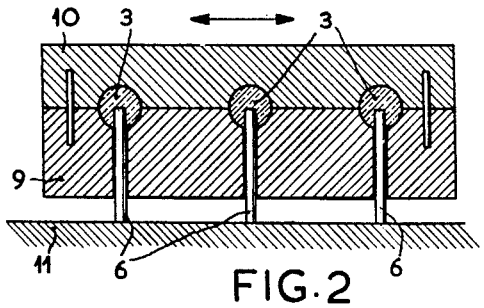
FIG.2
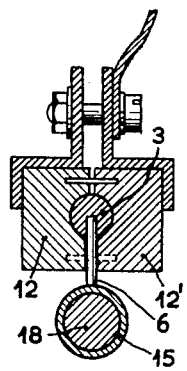
FIG.3
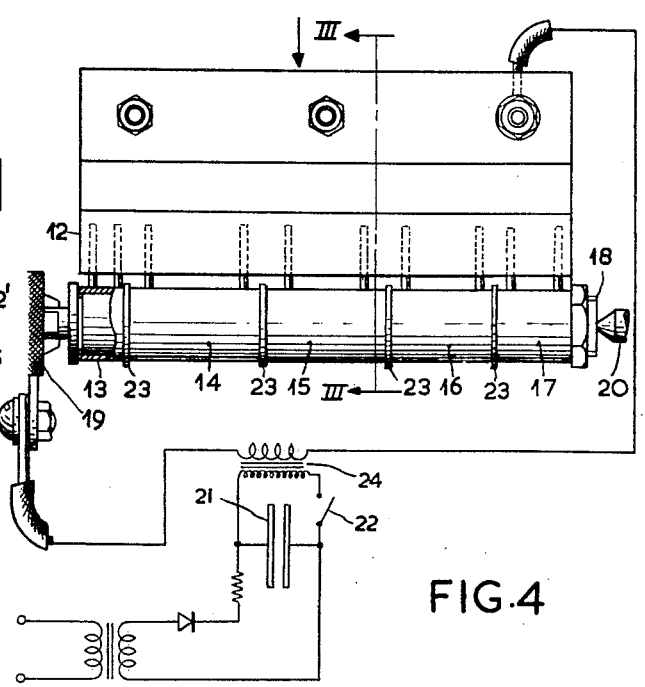
FIG.4
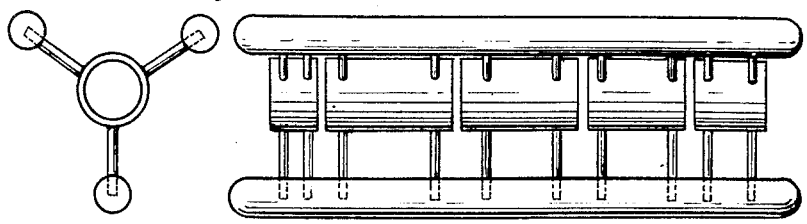
FIG.5
FIG.6
INVENTOR
HARM HARHUIS
FRANCISCUS ANTONIUS JACOBS
BY
AGENT

United States Patent Office

2,960,595
ASSEMBLY METHOD FOR CATHODE-RAY TUBE ELECTRODE SYSTEM

Harm Harhuis and Franciscus Antonius Jacobs, Eindhoven, Netherlands, assignors, by mesne assignments, to North American Philips Company, Inc., New York, N.Y., a corporation of Delaware Filed Oct. 18, 1956, Ser. No. 616,855

Claims priority, application Netherlands Nov. 18, 1955

4 Claims. (Cl. 219—107)

This invention relates to methods of relatively fixing metallic objects in determined positions by means of a plurality of supporting rods in turn held in position by at least one insulating supporting body. The invention relates more particularly to the assembly of electrodes for a cathode-ray tube which must be exactly centred with respect to one another.

Such electrodes, for example the cylindrical electrodes of an electron gun or the deflection plates, are in many cases fixed in position by means of supporting rods welded at right angles to the surfaces of the electrodes and which, after the electrodes have been correctly positioned in a templet, are sealed at their free extremities into one or more insulating supports, for example glass rods. For this purpose, the supporting rods are usually divided into groups of relatively parallel rods located in one plane, so that the rods of each group are secured in a common insulating support. Two or three such groups of supporting rods are usually divided over the periphery of the electrodes. Since the supporting rods are first welded to the electrodes and only then sealed into a heated glass rod, mechanical stress is set up in the supporting rods during the cooling of the glass rod, so that the electrodes can shift after the templet has been removed and the desired coaxial position is not maintained. Even small shifts are very undesirable in the case of electrodes for cathode-ray tubes, where the alignment requirements are very strict.

These difficulties may be fully avoided while obtaining very accurate relative fixation by the method according to the invention, in which the objects, such as the metal electrodes, are exactly positioned with respect to one another and fixed by means of a templet and connected to one pole of a source of welding current. The supporting rods are first divided over one or more groups, the supporting rods of each group then being exactly positioned with respect to one another in a templet. Next, the rods are connected to a supporting body and then made free from stress by annealing. Thereafter all supporting rods of the same group are given the correct length and connected to the other pole of the source of welding current, and the extremities of the supporting rods then simultaneously brought into contact with the surface of the objects to be joined therewith, whereafter all supporting rods of at least one group are simultaneously connected by butt-welding to the surfaces which are in contact therewith.

In order that the invention may be readily carried into effect, one embodiment will now be described, by way of example, with reference to the accompanying drawing, in which:

Fig. 1 shows a holder for securing the supporting rods in the supporting members.

Fig. 2 shows another holder for giving the supporting rods the correct length.

Figs. 3 and 4 show details of the device for welding the supporting rods to the electrodes, and Figs. 5 and 6 show the assembly of electrodes manufactured by the method according to the invention.

Fig. 1 is a sectional view of a graphite templet which is constituted by parts 1 and 2 and has a cylindrical cavity in which a supporting member in the form of a glass rod 3 has been laid. The part 2 of the templet has a metallic abutment 4 of U-shaped section. Channels 5 are provided at the desired areas in the abutment 4 and the part 2 of the templet and through these channels extend the supporting rods 6, in this case ten rods. The supporting rods 6, which in this case are of tungsten, may be introduced loosely into the channels 5, but it is preferable for them to be clamped in the apertures of a pressure member 7. The pressure member 7 is guided by guides 8 and the U-shaped abutment 4. The weight of the member 7 causes the supporting rods 6 to be urged onto the glass rod 3. The assembly is now subjected to high-frequency heating under an enclosure in a reducing atmosphere so that the glass rod 3 softens and the pins 6 may be pushed into it until the lower part of the weight 7 abuts against the base of the abutment 4. The glass rod 3 consists of a hard glass, such as is known under the registered trade name "Pyrex," Corning type No. 704 or 7052, having a softening point of about 700° C. After cooling, the glass rod together with the rods 6 sealed into it is removed from the templet and subsequently annealed in an oven at a temperature of about 480° C. for a few minutes, so as to remove mechanical stress from the glass rod and the supporting rods. The rods 6 already have substantially the same length, as reckoned from the surface of the glass rod 3, and are perfectly parallel. A plurality of such glass rods 3 provided with supporting rods are laid in a holder which may be constituted by two parts 9 and 10 (Fig. 2). The supporting rods project a little from this holder and may be ground to equal length by moving them to and fro across a polishing disc 11, so that the ends of the rods become flat.

As may be seen from Figs. 3 and 4, such a glass rod 3 together with its supporting rods 6 is then clamped in a metallic holder 12, 12' and connected to one terminal of a welding current source via a step down transformer 24. The rods 6 are rigidly clamped in position by the parts 12 and 12' of the holder, so that all of them make good electric contact with the holder 12, 12'.

The object to be fixed, in this case cylindrical electrodes 13, 14, 15, 16, 17 (Fig. 4) of an electron gun for a cathode-ray tube, are slipped onto a templet 18 with the use of spacer rings 23 so as to ensure exact relative centering. The templet 18 in this case is of steel and secured between a clamping head 19 and a center 20 and thus connected to the other terminal of the welding current source, in this case a capacitor 21.

The holder, 12, 12' is now pushed downwards, so that the polished extremities of the supporting rods 6 simultaneously come into contact with blank surfaces of the electrodes 13 to 17, whereupon the welding current is switched on by means of a switch 22.

It has been found that all of the rods 6 are welded simultaneously to the surfaces of the electrodes 13 to 17. In a similar manner it is possible for one or more groups of rods 6 sealed into a glass rod to be secured to the electrodes, so that a rigid assembly is obtained as shown in Figs. 5 and 6. Since the rods 6, after being sealed into the glass rods 3 which preferably are of hard glass (Pyrex), are made free from mechanical stress and given exactly the correct length, and the welding current does not substantially heat the supporting rods and the electrodes except at the welding area itself, no mechanical stress is set up in the rods 6 and the electrodes exactly keep their correct positions after the templet 18 has been removed. The electrodes consist of, for example, a copper-nickel alloy such as constantan.

Although an embodiment has been described in which the extremities of all rods 6 of a group are located in one plane, it is also possible to give one or more rods a different length if this should be necessary because of unequal diameters of several electrodes. Furthermore, the invention is also applicable to flat electrodes such as flat deflection plates for cathode-ray tubes. These parts are secured to a plane templet for the simultaneous welding of the supporting rods 6.

It has been found that the welding pressure may be maintained constant regardless of the number of the points of welding, but it is necessary for the value of the total welding current, and hence of the capacitor 21, to be matched to the number of the points of welding.

In one embodiment for manufacturing a gun as shown in Fig. 5 consisting of 5 electrodes, the diameter being 10 mm., the lengths 10, 10, 38, 14 and 10 mm. respectively, and consisting of constantan with a wall thickness of 0.5 mm., the electrodes are first placed on a templet. Ten rods of tungsten, having a diameter of 0.6 mm. and a length of 7 mm. are placed in a holder. The rods are sealed in a Pyrex rod as described above, such that 4 mm. of the rods protrude from the glass, and the free ends polished to perfect flatness. The ten rods are then pressed against the electrodes on the templet, with a force of about 7 to 8 kg., and welded simultaneously. The welding current is provided by a condenser of 1260 $\mu$f., which is loaded to 700 v. The discharge current of the condenser is led through a step-down transformer so that the welding voltage is 7 v. When welding 1 rod, the necessary condenser capacity proved to be 20 $\mu$f., with 6 rods 256 $\mu$f., and with 8 rods 594 $\mu$f.

Three Pyrex rods, each with 10 supporting rods, were provided at 120° angles for supporting the electrodes.

What is claimed is:

1. A method of assembling together a plurality of discrete, metallic cylindrical electrodes in a predetermined, accurate, spatial relationship, comprising sealing, by means of heat, a plurality of supporting rods at one end into a common glass rod so that the supporting rods are substantially aligned in a common plane thereby to establish stresses in the supporting rods, thereafter subjecting the supporting rods and glass rod to a heat treatment to anneal same and thus remove said stresses, thereafter adjusting the lengths of the supporting rods, thereafter bringing the free ends of the adjusted supporting rods each into contact with a surface of one of said metallic electrodes while the latter are temporarily supported in the predetermined relationship on a mandrel, and passing current simultaneously and in parallel manner through all the rods and electrodes to butt-weld the former to the latter without unduly reheating the rods.

2. A method as set forth in claim 1 wherein the supporting rods are parallel to one another, and the ends of the rods are ground flat simultaneously during the length adjusting step.

3. A method as set forth in claim 1 wherein a second group of like supporting rods are butt-welded by a similar process to circumferentially-spaced surface portions of the same cylindrical electrodes.

4. A method of assembling together a plurality of discrete, metallic cylindrical electrodes in a predetermined, accurate spatial relationship to form a gun for a cathode-ray tube, comprising sealing, by means of heat at a given temperature, a plurality of metal supporting rods at one end into a common hard glass rod so that the supporting rods are substantially aligned in a common plane thereby to establish stresses in the supporting rods, thereafter subjecting the supporting rods and glass rod to a heat treatment at a temperature lower than said given temperature to anneal same and thus remove said stresses, thereafter removing material from the free ends of the supporting rods to adjust their lengths to predetermined values, thereafter bringing the free ends of the adjusted supporting rods each into contact with a surface of one of said metallic electrodes while the latter are temporarily supported in the predetermined relationship on a mandrel, and passing current simultaneously and in parallel manner through all the supporting rods and electrodes to butt-weld the former to the latter without unduly reheating the supporting rods.

References Cited in the file of this patent

UNITED STATES PATENTS

| | | |
|---|---|---|
| 1,252,144 | Murray et al. | Jan. 1, 1918 |
| 1,929,444 | Murray et al. | Oct. 10, 1933 |
| 2,045,420 | Strickland | June 23, 1936 |
| 2,340,459 | Eitel | Feb. 1, 1944 |
| 2,354,028 | Kershaw | July 18, 1944 |
| 2,566,318 | Dalin et al. | Sept. 4, 1951 |
| 2,779,858 | Pityo | Jan. 29, 1957 |
| 2,817,746 | Henderson | Dec. 24, 1957 |